METHOD FOR PREPARING RANDOM COPOLYMERS OF FORMALDEHYDE AND OLEFIN OXIDE SILANE AND/OR VINYL ETHER SILYL

Robert Alton Setterquist, Wilmington, Del., assignor to E. I. du Pont de Nemours and Company, Wilmington, Del.

No Drawing. Continuation-in-part of application Ser. No. 9,983, Feb. 9, 1970, now Patent No. 3,661,854, dated May 9, 1972. This application Nov. 16, 1971, Ser. No. 199,330

Int. Cl. C08g 1/14, 1/18

U.S. Cl. 260—67 FP                                       11 Claims

ABSTRACT OF THE DISCLOSURE

Random copolymers of formaldehyde monomer and olefin oxide silane and/or vinyl ether silyl monomers can be prepared by reacting said monomers at a temperature of from about —20° to about 100° C. in the presence of a perfluoroalkylstibine catalyst having the formula

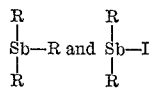

in which R is perfluoroalkyl of from 1–8 carbon atoms.

PRIOR APPLICATION

This application is a divisional continuation-in-part of my application Ser. No. 9,983, filed Feb. 9, 1970, now U.S. Pat. No. 3,661,854, granted May 9, 1972.

SUMMARY OF THE INVENTION

The present invention provides a novel process for the preparation of high molecular weight random copolymers of formaldehyde with olefin oxides and vinyl ethers in the presence of a perfluoroalkylstibine catalyst.

Olefin oxides and vinyl ethers can be copolymerized with formaldehyde in the presence of these perfluoroalkylstibine compounds to yield a high molecular weight oxymethylene copolymer in which the vinyl ethers and olefin oxides are generally randomly distributed throughout the copolymer. In addition, medium molecular weight copolymers suitable for coating compositions also having a random distribution of comonomers can be formed by proper selection of comonomer polymerization temperature and if desired, by the inclusion of a chain transfer agent, e.g. methanol or methylal in the proper amount.

The copolymers formed by this process have a high degree of base stability which is the result of the introduction into the polyoxymethylene chain of olefin oxide and vinyl ether monomer units.

BACKGROUND OF THE INVENTION

Prior art copolymers of formaldehyde and olefin oxides and vinyl ethers made with the usual Lewis acid catalyst such as $BF_3$, $SnBr_4$ and the like exhibit a high degree of base stability also, but because of the nature of the catalyst used in preparation, the comonomer unit is introduced into the polymer chain often in succession leading to the formation of short sequences of comonomer units in the chain rather than to the random distribution achieved by use of the present perfluoroalkylstibines. U.S. Pat. 3,076,786 describes the preparation of copolymers which are less random than those prepared according to the invention. Random introduction of comonomer units produces a copolymer whose melting point is depressed to a greater degree by the introduction of a given number of the comonomer units, than by an equal number of comonomer units introduced as multiple short sequences by the prior art methods. This allows for a maximum reduction in the melting point of the copolymer to be produced by the minimum introduction of comonomer units. Since a lower melting point often is desirable in an acetal copolymer in order to facilitate moldability and since the comonomer unit often is more expensive than formaldehyde, it is clear that maximum benefit can be obtained at minimum cost by such a process. In addition, the desirable physical properties of the formaldehyde homopolymer are more nearly retained in a random copolymer than in a blocky copolymer for any given number of comonomer units introduced. Furthermore, the more random copolymers lose a lower percentage of their total weight as unstable chain ends during base treatment after polymerization to produce a base-stable product than do the nonrandom or more blocky type of copolymers that contain the same number of comonomer units.

In the presence of the instant catalysts, cyclic formals, e.g. dioxolane, are not readily copolymerized with formaldehyde. This is a further distinguishing feature of the catalysts over the common Lewis acids which generally are active catalysts for the homo- and copolymerization of cyclic formals.

DETAILED DESCRIPTION OF THE INVENTION

The random copolymers of this invention are produced by reacting formaldehyde and a comonomer at a temperature of from about —20° C. to about 100° C. in the presence of a perfluoroalkylstibine catalyst having the formulas (1) 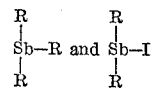

in which R is perfluoroalkyl of from 1 to 8 carbon atoms and preferably from 1 to 4 carbon atoms. Typical of the perfluoroalkylstibine catalysts are tris-trifluoromethylstibine
tris-perfluoroheptylstibine
tris-pentafluoroethylstibine
bis-(trifluoromethyl)-iodostibine.

Dialkylstibine and trialkylstibine will not initiate copolymerization of formaldehyde and the comonomers described in this invention although they may be used to produce homopolymers of formaldehyde as described in U.S. Pat. 2,828,286.

The catalysts of this invention are mildly pyrophoric and are adversely affected by low concentrations of oxygen. Therefore, best results are generally obtained when precautions are taken to exclude oxygen from the polymerization system.

The upper limit of catalyst concentrations is set practically by economic consideration which for a conventional polymerization would be less than about 2,000 parts per million based on the polymerization medium. The lower limit is about 10 parts per million. The preferred operating range is from about 30 to 500 parts per million of catalyst in a liquid polymerization medium.

The preferred comoners for this formaldehyde copolymerization are (a) Olefin oxides having the formula (2) 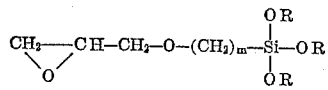

where $m$ is 3 or 4 and R is alkyl of from 1–4 carbon atoms or aryl of 6–10 carbon atoms and the R's may be alike or different, and (b) Vinyl ethers having the formula (3) 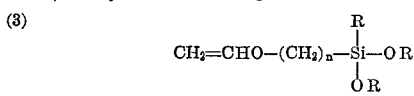

where $n$ is 2–4 and R is alkyl of from 1–4 carbon atoms or aryl of 6–10 carbon atoms and the R's may be alike or different. Preferred comonomers include gamma-glycidoxypropyltrimethoxy silane and β-(diethoxymethylsilyl)ethyl vinyl ether.

From 0.05 to about 10 mole percent of the comonomer, based upon the moles of formaldehyde, of the olefin oxide or vinyl ether is employed in this invention. The preferred range is about 0.2 to 2.0 mole percent.

The monomers employed in the present process should be substantially pure and anhydrous, i.e., in the case of formaldehyde it should contain less than a total of about 1% by weight of substances that can react with formaldehyde or interfere with its polymerization. When high molecular weight products are desired, the formaldehyde should contain no more than about 0.2% of such substances. Methods for obtaining formaldehyde of the required purity are known. The olefin oxides and vinyl ethers should be substantially free from protonic impurities. If desired, the molecular weight of the copolymers may be regulated by the addition of a small amount of chain transfer agent such as methylal or methanol.

The copolymerization may be conducted in any medium in which the formaldehyde and the comonomer may be intimately contacted in the presence of the catalyst provided that the medium does not react with the monomers or polymer and does not excessively deactivate the catalyst. When the medium is a liquid, it should be anhydrous for best results. It can be either flammable or inflammable as for example heptane, hexane, cyclohexane, benzene, toluene, ethylbenzene, methylene chloride, chloroform, carbon tetrachloride, 1,2-dichloroethene, trichloroethene, tetrachloroethene (perchloroethylene), chlorobenzene, o-dichlorobenzene and m-dichlorobenzene or mixtures thereof. If desired, the copolymerization may be carried out in the absence of a liquid medium as for example in a fluidized bed or in an inert gas.

The reaction can be conducted at a temperature of from about −20° C. to about 100° C. The preferred temperature range is from about 20° C. to about 80° C.

The copolymers produced by the process of this invention exhibit substantial base stability, a medium or high molecular weight and a melting point lower than that of the polyoxymethylene homopolymer of similar molecular weight. The inherent viscosities measured in phenol range from about 0.3 to 0.7 for the medium molecular weight copolymers and are generally above 0.7 for the high molecular weight copolymers. Inherent viscosities are conveniently measured in either of two solvents, phenol or hexafluoroisopropyl alcohol. In the case of phenol, the inherent viscosity is measured at 90° C. on a solution of 0.5 gram of polymer in 100 ml. of phenol. In the case of hexafluoroisopropyl alcohol, the inherent viscosity is measured at 35° C. on a solution of 0.5 gram of polymer in 100 ml. of hexafluoroisopropyl alcohol containing one gram of diphenylamine. The relationship between inherent viscosities of these copolymers as measured in these two systems is such that the inherent viscosity in hexafluoroisopropyl alcohol is equivalent to about 1.44 times the inherent viscosity measured in phenol. The formula for inherent viscosity is that reported by L. H. Cragg in "Journal of Colloid Science," volume 1, pages 261–9 (May 1946) and is well known.

The analysis for the number of vinyl ether or olefin oxide units in the copolymer is accomplished by nuclear magnetic resonance or by chemical analysis.

Due to the presence of a comonomer unit containing carbon-carbon linkages, the products of the present invention exhibit substantial base stability which stability may be determined by dissolving approximately 2 grams (weighed to the nearest 0.01 gram) of polymer under a nitrogen blanket in 50 ml. of benzyl alcohol containing 1% by weight potassium hydroxide and heating the solution at 165° C. for 40 minutes. Following the heating, the solution is cooled to 25° C. and the precipitated polymer is collected on a filter, washed six times with 100 ml. of a 3–1 mixture of methanol and water, three times with 100 ml. portions of acetone, and dried under vacuum at 70° C. for 16 hours. Base stability is expressed as a percentage of the original polymer remaining after treatment.

The melting point of the copolymers of the present invention is determined by differential thermal analysis according to the general method in the chapter "Applications of Differential Thermal Analysis to High Polymers," Organic Analysis, vol. IV, page 361, Interscience Publishers, Inc. (1960). A Du Pont Model 900 Differential Thermal Analyzer is adjusted to a heating rate of 10° C. per minute using glass beads as a reference and a sample of polymer is placed in a capillary tube 1.5 to 2.0 mm. in diameter and 2.5 cm. in length which is maintained under a nitrogen blanket. The polymer is heated to 15° C. above its original melting point following which it is cooled approximately five minutes until it reaches a temperature of about 130° C. whereupon the sample is reheated and the melting point is observed. The base stable portion of an etherified polyoxymethylene having an inherent viscosity of 1.0 measured in phenol melts at about 172–174° C. in this test.

The above process has been used to prepare novel copolymers containing repeating units of

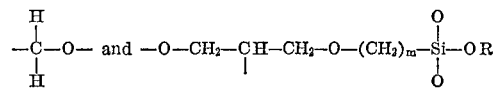

where $m$ is 3 or 4 and R is alkyl of from 1–4 carbon atoms or aryl of from 7–10 carbon atoms and the R's may be alike or different. A specific example of these compounds is the copolymer of formaldehyde and gamma-glycidoxypropyltrimethoxysilane. These compounds have utility as glass coatings which resist separation of the polymer from the glass after curing or bonding.

The method used for preparing $Sb(CF_3)_3$ was that described by Haszeldine (J. Chem. Soc., 1957, 3708) which consisted of the reaction of trifluoromethyl iodide with antimony pellets at 165–170° C. for 14 hours at 600 p.s.i. in a steel reactor. In a typical experiment, antimony (100 g.) and trifluoromethyl iodide (100 g.) heated at 165° C. for 14 hours gave a mixture which was washed from the reactor with 100 ml. of toluene and distilled to yield 17 g. of pure $Sb(CF_3)_3$ B.P. 72–75° C. Removal of the toluene and vacuum distillation gave 3 g. of bis(trifluoromethyl) iodostibine (B.P.=120° C.). The solid residue remaining in the reactor consisted of unreacted antimony metal and $SbI_3$.

$Sb(C_2F_5)_3$ was prepared using the method described above. 98 g. of perfluoroethyl iodide was reacted with 100 g. of antimony pellets (⅛″) at 165° C. for 14 hours at 600 p.s.i. At the end of the reaction period the reactor was cooled and the crude product (42 g.) was removed under nitrogen. Distillation of the crude product gave 14.3 g. of tris-perfluoroethyl-stibine boiling at 46° C. at 62 mm. pressure. This catalyst was used for the copolymerization of formaldehyde and propylene oxide according to Example 14.

$Sb(C_7F_{15})_3$ was prepared as follows: into a 35 cc. heavy-walled ¾″ tube was placed 8.1 g. of antimony metal. The tube was stoppered with a septum stopper, evacuated and purged with nitrogen and 41.9 g. of freshly distilled perfluoroheptyl iodide pressured into the tube through 19 gage stainless steel tubing. The heavy walled tube was capped with a neoprene lined crown cap, evacuated and purged with nitrogen. The tube was placed in a vessel, pressured to 25 p.s.i. with nitrogen and the assembly placed in an oil bath at 165° C. After 6 hours with intermittent shaking the tube was removed from the oil bath cooled and the product slurry transferred to a distillation flask.

Unreacted perfluoroheptyl iodide (11.5 cc.) boiling at 35° C. at 6 mm. pressure was removed by distillation through an 18" x ½" spinning band column. The spinning band column was replaced with a simple still head and trisperfluoroheptylstibine boiling at 110° C. at 0.5 mm. was distilled from unreacted antimony and SbI$_3$ remaining in the distillation flask. There was obtained 1.86 g. of product. Analysis of the product by nuclear magnetic resonance as a 10% solution in carbon tetrachloride showed fluorine absorption typical of —CF$_2$—Sb— compounds.

It will be apparent to one skilled in the art that the copolymerization reaction can be carried out in a continuous manner if desired.

Quantities expressed in the following examples are by weight unless otherwise stated.

EXAMPLES

Example 1

Polymer was prepared according to the following technique: Formaldehyde gas was generated by continuously pyrolyzing cyclohexyl hemiformal at approximately 150° C. and directing the pyrolysis vapors to a condenser, the temperature of which was regulated to condense cyclohexanol and water and to permit formaldehyde gas to pass through. The gas was then directed through a series of twelve "U" tubes approximately one inch in diameter by twelve inches in height which were packed with stainless steel packing and maintained at a temperature of —18° C. by immersing approximately ten inches of the lower portion in an acetone bath cooled with solid carbon dioxide. The CH$_2$O vapors at the rate of about 1.7 parts/min. were directed into a 500 cc. glass flask, which previously had been purged with N$_2$ to remove O$_2$, equipped with a stirrer, thermocouple probe and septum stoppered injection ports and containing 274 parts of benzene and 1.6 parts of methyl vinyl ether. Approximately one minute after introduction of the formaldehyde gas, 0.1 part of tristrifluoromethylstibine was added and a continuous flow of methyl vinyl ether gas of approximately 0.1 part/min. was introduced into the formaldehyde stream at the inlet to the reactor. The temperature of the medium was maintained at 25° C. by cooling the reactor in an ice bath. After ten minutes the flow of formaldehyde was stopped and the reactor swept with nitrogen. The product was isolated by filtration and washed on the filter with five 100-part portions of acetone. The washed polymer was dried in a vacuum oven at 25° C. for 64 hours to yield 16.8 parts of dry polymer. Approximately 2.7 parts of the dried polymer was contacted with 52 parts of benzyl alcohol containing 0.5 part of 85% aqueous KOH and heated to 165° C. for 45 minutes with nitrogen agitation of the solution following which the solution was cooled to 25° C. and the alcohol removed by suction filtration. The solids remaining were slurried with a 1/1 mixture of methanol and water and the slurry filtered. The polymer recovered was washed five times with methanol to remove unreacted base and dried at 90–100° C. in a vacuum oven under a nitrogen blanket for 4 hours. Approximately 2.1 parts of the polymer charged was recovered. The recovered KOH-base stable polymer had an inherent viscosity of 1.02 (0.5% solution in phenol at 90° C.) and melted at 146° C. by differential thermal analysis. NMR analysis showed the polymer to be a copolymer containing approximately 6 mole percent of ether side groups derived from incorporation of methyl vinyl ether. The copolymer could be molded at 185° C. into a flexible tough film which was almost bubble-free, indicative of good thermal stability.

Example 2

The copolymer was prepared as set forth in Example 1 except trichloroethylene was used as a polymerization medium and methyl glycidyl ether was used as a comonomer. Formaldehyde purified by passage through three 1" x 12" "U" traps at 0° C. was directed at the rate of about 1.0 part/min. into a reactor containing 365 parts of trichloroethylene and 6 parts of methyl glycidyl ether. After 2 minutes, 0.03 part of tristrifluoromethylstibene in 0.24 part of toluene was added to the reactor, and the temperature of the slurry was maintained at 35° C. during the polymerization. After 10 minutes, the flow of formaldehyde to the reactor was stopped and the reactor swept with nitrogen for 5 minutes. The catalyst was neutralized with 10 parts of 28% aqueous ammonium hydroxide and the slurry filtered to separate the polymer. The white polymer which collected on the filter was washed with five 100-part portions of acetone and dried in a vacuum oven at 60° C. for 16 hours. There were obtained 9.5 parts of crude copolymer which had a tributylamine base stability of 62.9%. The base-stable fraction had an inherent viscosity measured as a 0.5% solution in hexafluoroisopropyl alcohol at 35° C. of 1.92 and melted 4° C. lower than an acetylated homopolymer of approximately equal molecular weight. Analysis by nuclear magnetic resonance techniques showed the base-stable fraction to contain 0.2 mole percent

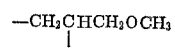

groups in the copolymer.

Example 3

The copolymer was prepared as set forth in Example 2 except that gamma-glycidoxypropyltrimethoxysilane was used as the comonomer. Formaldehyde was directed into a reactor containing 365 parts of trichloroethylene and 10 parts of gamma-glycidoxypropyltrimethoxysilane. After 2 minutes, 0.05 part of tris-trifluoromethylstibine dissolved in 0.48 part of toluene was added to initiate the polymerization. The temperature of the polymerization medium was maintained at 45° C. After 10 minutes, the formaldehyde was stopped and nitrogen swept through the reactor for 5 minutes. The reaction slurry was made basic by the addition of 2 parts of tributylamine. The polymer was separated by filtration of the reaction mixture, washed five times with 100-part portions of methanol and dried in a vacuum oven for 4 hours at 80° C. There was recovered 13.1 parts of crude polymer which had a tripropylamine base stability of 31.6% and an inherent viscosity measured on a 0.5% solution of the crude polymer in hexafluoroisopropyl alcohol at 35° C. of 1.92. The copolymer melted 7° C. lower than an acetylated acetal homopolymer of approximately the same molecular weight.

Example 4

Formaldehyde was generated by pyrolysis of cyclohexyl hemiformal at 145° C. The product vapors were directed through a condenser maintained at 16° C., then through on "U" tube approximately one inch in diameter by twelve inches in height containing a small amount of mineral oil at 25° C. at the bottom of the tube which acts as a bubble flow indicator. The formaldehyde was then directed into thirteen additional "U" traps packed with stainless steel. The first "U" tube was at 25° C. and the remaining twelve were at 0° C. The "U" tubes removed water, formic acid, and cyclohexanol.

The purified formaldehyde vapor was passed at a rate of about 1.1 parts/minute ratio into a reactor containing 264 parts of benzene, one part of β(diethoxymethylsilyl) ethyl vinyl ether and 0.09 part of tris-perfluoromethylstibine. The polymerization proceded at 35° C. after a 3-minute induction period. Additional one-part amounts of β(diethoxymethylsilyl)ethyl vinyl ether were added at 8 and 14 minutes into the run. Formaldehyde addition was continued for a total of 19 minutes. The reaction was then stirred under nitrogen for four minutes and quenched with 4 parts of triethylamine in 16 parts of methanol. The crude copolymer was recovered by filtration, washed with three 250-part portions of acetone and dried in a vacuum oven at 25° C. to yield 24.2 parts of product. The copolymer had an inherent visccosity of 1.36 in hexafluoroisopropyl alcohol (35° C.).

The ccopolymer product was stabilized by solution ester capping. Three grams of crude product was mixed with 54 parts of propionic anhydrides and 6 parts of quinoline and stirred under nitrogen for 30 minutes. The polymer was then taken into solution at 168° C. and cooled. The precipitated polymer was collected by filtration and washed with three portions of 75% acetone-25% methanol followed by two portions of acetone. The product was quantitatively recovered after vacuum drying overnight. The copolymer had a melting point of 167° C. as determined by the differential thermal analysis. It was determined by NMR measurements that approximately 1.0 mole percent of the comonomer had been incorporated into the main chains of the copolymer.

Example 5

The copolymer was prepared as set forth in Example 1 except heptane was used as a polymerization medium and tris-perfluoroheptylstibine was used as a catalyst. Formaldehyde purified by passage through 12 "U" traps cooled to −18° C. was passed at a rate of approximately 1.6 parts/min. into a polymerization vessel containing 205 parts of heptane and 12.5 parts of propylene oxide. After 2 min. 0.09 part of tris-perfluoroheptylstibine in 1.6 parts of carbon tetrachloride was added to the polymerization reactor. The temperature of the reaction was maintained at 40° C. After 10 minutes the formaldehyde flow was stopped and the reactor swept with nitrogen for 10 minutes. The reaction slurry was made basic by the addition of 2 parts of tributylamine and the polymer separated by filtration, washed with five 100-part portions of methanol and dried in a vacuum oven at 40° C. for 16 hours. There was recovered 11.1 parts of dry copolymer having a base stability measured with KOH of 48% and an inherent viscosity measured in hexafluoroisopropyl alcohol at 35° C. of 2.58.

I claim:

1. A process for producing base stable copolymer of formaldehyde monomer and one other monomer selected from the group of monomers consisting of
   (a) oxides having the formula

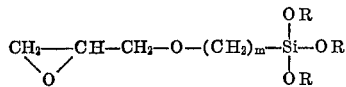

where
   $m$ is an integer of 3 or 4 and
   R is alkyl of 1 through 4 carbon atoms or aryl of 6 through 10 carbon atoms; and
   (b) vinyl ethers having the formula

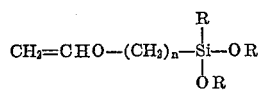

where
   $n$ is an integer of 2 through 4 and
   R is alkyl of 1 through 4 carbon atoms or aryl of 6 through 10 carbon atoms;
wherein said other monomer is present in the polymer to the extent of 0.05 to about 10 mole percent based upon the moles of formaldehyde, which comprises polymerizing one of said monomers with formaldehyde monomer at a temperature of from about −20° C. to about 100° C. in a polymerization medium in the presence of a perfluoroalkylstibine catalyst having the formulae

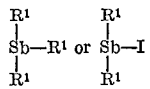

where $R^1$ is perfluoroalkyl of 1 through 8 carbon atoms.

2. A process according to claim 1 wherein the catalyst is tris-trifluoromethylstibine.

3. A process according to claim 1 wherein the catalyst is bis-(trifluoromethyl) iodostibine.

4. A process according to claim 1 wherein the catalyst is tris-pentafluoroethylstibine.

5. A process according to claim 1 wherein the catalyst is tris-perfluoroheptylstibine.

6. A process according to claim 1 wherein the other monomer is gamma-glycidoxypropyltrimethoxysilane.

7. A process according to claim 1 wherein the other monomer is β-(diethoxymethylsilyl) ethyl vinyl ether.

8. A process according to claim 1 wherein the polymerization medium is n-heptane.

9. A copolymer consisting essentially of recurring units of a first monomer

and a second monomer

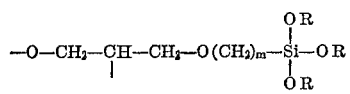

where
$m$ is an integer of 3 or 4 and
R is alkyl of 1 through 4 carbon atoms or aryl of 7 through 10 carbon atoms wherein said other monomer is present in the polymer to the extent of 0.05 to about 10 mole percent based upon the moles of formaldehyde.

10. A copolymer according to claim 9 wherein said second monomer has the formula

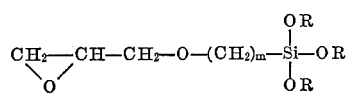

where
$m$ is an integer of 3 or 4 and
R is alkyl of 1 through 4 carbon atoms.

11. A copolymer according to claim 9 wherein said second monomer is gamma glycidoxypropyltrimethoxysilane.

References Cited

UNITED STATES PATENTS

| | | | |
|---|---|---|---|
| 2,946,701 | 7/1960 | Plueddemann | 260—46.5 Y X |
| 3,087,913 | 4/1963 | Kray et al. | 260—73 L |
| 3,275,604 | 9/1966 | Kray et al. | 260—67 FP |
| 3,483,161 | 12/1969 | Von der Emden et al. | 260—46.5 Y |

WILLIAM H. SHORT, Primary Examiner

L. M. PHYNES, Assistant Examiner

U.S. Cl. X.R.

260—46.5 Y, 73 L, 91.1